United States Patent

Breen

[15] 3,637,947

[45] Jan. 25, 1972

[54] CALL FORWARDING ARRANGEMENT FOR TELEPHONE ANSWERING SERVICE SYSTEMS

[72] Inventor: Charles Breen, Colts Neck, N.J.

[73] Assignee: Bell Telephone Laboratories, Incorporated, Murray Hill, Berkeley Heights, N.J.

[22] Filed: Dec. 22, 1969

[21] Appl. No.: 886,944

[52] U.S. Cl. ...... 179/27 FH
[51] Int. Cl. ...... H04m 5/50, H04m 3/60
[58] Field of Search ...... 179/27 FH, 26

[56] References Cited

UNITED STATES PATENTS 3,248,486 4/1966 Wadsworth ...... 179/26

*Primary Examiner*—William C. Cooper
*Attorney*—R. J. Guenther and James Warren Falk

[57] ABSTRACT

A central office, comprising a main switching network and control circuitry for interconnecting line circuit appearances and trunk circuit appearance in the normal manner, is modified by the addition of an auxiliary switching network upon which are terminated telephone answering board incoming trunks and call forwarding trunks. These trunks also appear at respective remote telephone answering switchboards and each has a line circuit appearance in the main switching network. The system is arranged so that an incoming connection via a telephone answering board incoming trunk may be extended to a remote destination via a selected call forwarding trunk under control of the telephone answering board. A controller circuit associated with the auxiliary switching network is responsive to control signals from the remote telephone answering switchboard to enable a connection between the activated telephone answering board incoming trunk and the selected call forwarding trunk via the auxiliary switching network located at the central office.

11 Claims, 8 Drawing Figures

INVENTOR
C. BREEN
BY Brendan A. Ward
ATTORNEY

CALL FORWARDING ARRANGEMENT FOR TELEPHONE ANSWERING SERVICE SYSTEMS

BACKGROUND OF THE INVENTION

1. Field of the Invention

This invention pertains to switching systems and particularly to switching arrangements within such systems for extending communications connections initially terminated to associated telephone switchboards.

2. Description of the Prior Art

In modern telephone switching systems, various features have been provided which make it possible for a connection directed to a called station to be automatically extended to another station during the absence of the subscriber at the originally called station (see, for example, U.S. Pat. No. 2,274,759, dated Mar. 3, 1942, issued to J. W. Wicks; see also U.S. Pat. No. 3,363,063, dated Jan. 9, 1968, issued to S. Kandel and C. C. Neilson). Such arrangements fulfill the need of the average telephone subscriber who is usually concerned with a relatively few incoming calls during his absence.

However, other subscribers, such as physicians, also require a similar arrangement but on a significantly higher scale than conventional subscribers in view of the relatively large number of calls involved in conjunction with the nature of such calls. In regard to this latter aspect, incoming calls to a physician, or similar telephone customer, may be classified in two broad categories. The first category comprises conventional, nonemergency calls. The second category comprises calls requiring immediate attention. In the first instance, the nature of the call does not warrant extension of the connection through to the physician. On the other hand, the second type call dictates the need for immediate extension of the connection through to the physician in privacy and without impairment of the calling connection transmission. Obviously, first it must be determined in which category a given calling connection is to be classified.

The solution to the foregoing problem is thus not found in the automatic extension of each calling connection in the manner provided for conventional subscriber service. Rather, to fulfill this need in the art, telephone answering switchboards have been provided wherein incoming calls to various subscribers, such as physicians, are completed through to one or more operator positions during the subscriber's absence. The answering operator thereupon determines the appropriate action to be taken in view of the particular situation presented. Thus, the insertion of the human element in the person of the answering service operator permits the flexible and expeditious handling of calls of this nature.

Although the presence of the operator thereby provides the necessary decision-making function with respect to the extension of each call, the need for automation of all other functions remains as desirable and necessary as in any other switching system. This is particularly true when the significant expansion of telephone answering services is noted. Thus, in an attempt to reduce operator effort and thereby increase the efficiency of such installations, automatic answer and automatic dialing by mere key manipulation at such locations are presently well known in the art. However, a significant problem still prevails with respect to incoming calls which are extended from the operator position through to a remote called station.

The particular problem presented is that in order to extend each such connection from a telephone answering switchboard, it is presently necessary to "patch" or extend an incoming trunk connection through to an outgoing trunk leading to an associated central office and thus ultimately to the called station. This obviously requires the provision of suitable outgoing trunk circuits from the telephone answering switchboard, each of which is required to include suitable supervisory apparatus to permit the attendant to maintain supervision during the existence of the extended connection. Such trunk circuits are inherently expensive and must be provided at each switchboard in sufficient quantity to adequately serve the estimated traffic. It is also to be recognized that most central offices have a plurality of diverse telephone answering switchboards associated therewith, each of which is presently required to have an individual group of outgoing trunk circuits provided for the above-stated purpose. Such an arrangement is inherently inefficient since the respective answering services' demands for the use of such trunk circuits do not necessarily coincide.

An additional problem of even greater severity in certain instances is that the present arrangement involves extending a connection from an incoming trunk from a central office through the telephone answering switchboard via a path circuit to an outgoing trunk back to a central office thereby substantially increasing the conductor length of the final communication path. Such an arrangement often poses transmission problems which are difficult to control because of the multiplicity of terminal points to which the final connection may ultimately extend.

Accordingly, a need exists in the art for a switching arrangement which is operable to expeditiously permit the extension of calling connections initially terminated to a telephone answering switchboard. Additionally, a need exists for such an arrangement which will obviate the requirement that an individual group of complex outgoing trunk equipment apparatus be provided at each such telephone answering switchboard. Also, a need exists for a switching arrangement which will permit the rapid completion of such extended calls from a telephone answering switchboard without requiring that the final communication path extend through the physical location at which the telephone answering switchboard is located.

SUMMARY OF THE INVENTION

In the exemplary embodiment a conventional central office, comprising a main switching network for interconnecting line circuits and trunk circuits in the normal manner, is equipped with a plurality of incoming trunks to telephone answering switchboards to which are extended incoming calls originally directed to certain called stations equipped for telephone answering service. The central office is modified by the addition of an auxiliary switching network having input terminals each respectively associated with one of the telephone answering switchboard incoming trunks and output terminals each respectively associated with one of a plurality of call forwarding trunks. Each of these latter trunks has a selectable appearance at a telephone answering switchboard and also appears at a line terminal input appearance on the associated main switching network at the central office. Upon the attendant at the answering board receiving a call via one of the telephone answering board incoming trunks and upon recognition that this call should be extended to a remote telephone station, the attendant places the call on hold and selects an available call forwarding trunk. Upon so doing, the line appearance of the call forwarding trunk is enabled in the main switching network. In response to dial tone, the attendant dials the directory number of the station to which the call is to be extended. Upon answer of that station and without releasing the call, the attendant transmits a control code from the attendant position over a control pair to a controller circuit associated with auxiliary switching network at the central office. The particular code transmitted identifies the initially activated telephone answering switchboard incoming trunk and the call forwarding trunk selected by the attendant to extend the call. In response to the registration of the control code, the controller circuit causes the completion of a network path through the auxiliary switching network to interconnect the two identified trunk circuits at the central office. The attendant may now disconnect from the outgoing trunk. The final communication path thus extends from the location of the originating station through the main switching network of the central office, via the activated telephone answering board incoming trunk, via a linkage path extending through the auxiliary switching network at the central office, through the selected call forwarding trunk, via the input appearance (line appearance) on the main switching network at the central office, through the output appearance on the network via an enabled trunk, to the station to which the call has been extended.

Lamp signals are provided to the attendant at the telephone answering board which indicate cessation of the calling connection thus permitting reselection of the associated equipment in connection with a subsequent call. However, during the existence of the initial call, the communication path extends only through the linkage provided at the central office and does not extend physically through the remote telephone answering board location.

In accordance with one feature of my invention, a call forwarding arrangement is provided for telephone answering switchboards comprising a common group of call forwarding trunk circuits which are accessible to a plurality of telephone answering switchboards thus obviating the need for the provision of an individual group of such trunks associated with each such board.

It is another feature of my invention that a switching arrangement is provided comprising an auxiliary switching network associated with a main switching network at a telephone central office through which connections may be extended under control of a telephone answering switchboard without requiring that the final communication path extend through the physical location at which the telephone answering switchboard is located.

DESCRIPTION OF THE DRAWING

The foregoing as well as other object, features, and advantages of the invention will be more apparent from the following description of the drawing in which.

It will be noted that FIGS. 5 through 8 employ a type of notation referred to as "detached-contact" in which an X, shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the *American Institute of Electrical Engineers Transactions, Communications and Electronics*, Vol. 74, pp. 505–513.

The present invention is illustrated in a telephone answering service consisting of a switchboard associated with a common control central office comprising a main switching network which is modified by the addition of an auxiliary switching network and an associated controller circuit which is accessible to the switchboard. In the instant embodiment, the common control system disclosed in the A. J. Busch U.S. Pat. No. 2,585,904, dated Feb. 19, 1952, has been selected as the associated central office. However, it will be obvious that the invention may in fact be embodied in numerous other types of switching systems.

Figure 1:
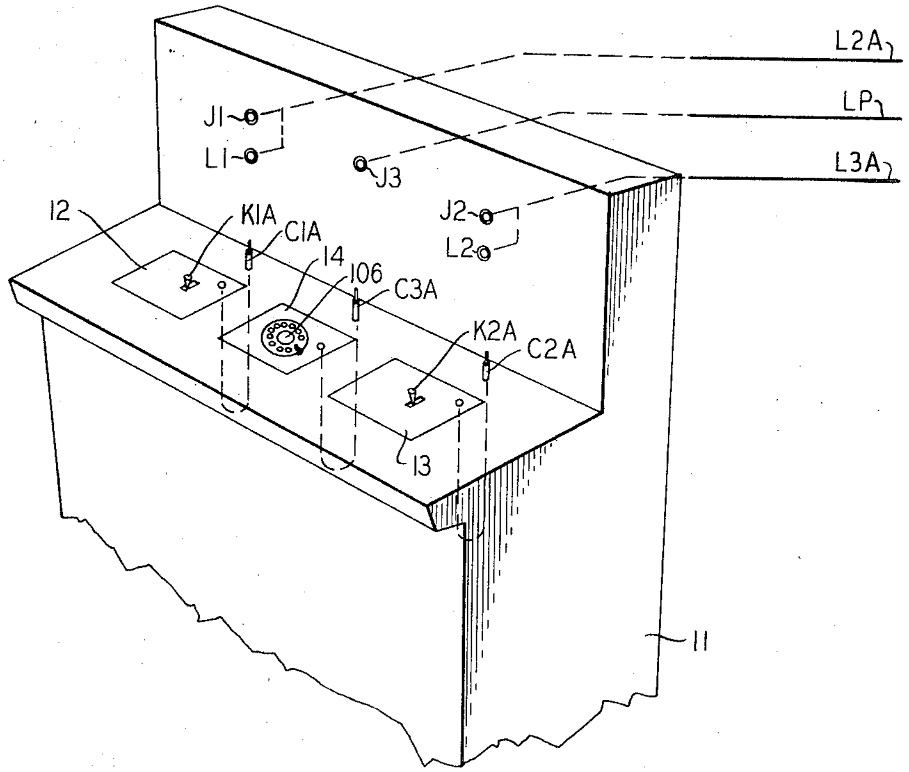
FIGS. 1 and 2 are essentially a block diagram showing the interrelationship of the components of the exemplary embodiment of the invention.
Figure 3:
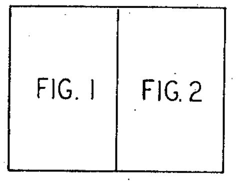
FIGS. 3 and 4 are the key sheets indicating the manner in which the other FIGS. should be arranged.
Figure 4:
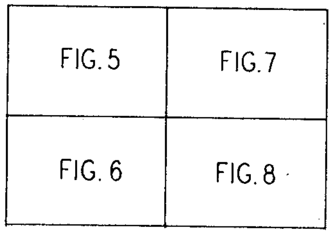

The invention described herein is particularly concerned with apparatus in auxiliary switching network 7, controller circuit 8, call forwarding trunk 5, and telephone answering board incoming trunk 6, which are represented by the blocks shown with heavy lines in FIG. 1 in order to distinguish them from prior art equipment units which are neither shown nor described in detail except where necessary for a complete understanding of the invention.

GENERAL DESCRIPTION

Figure 2:
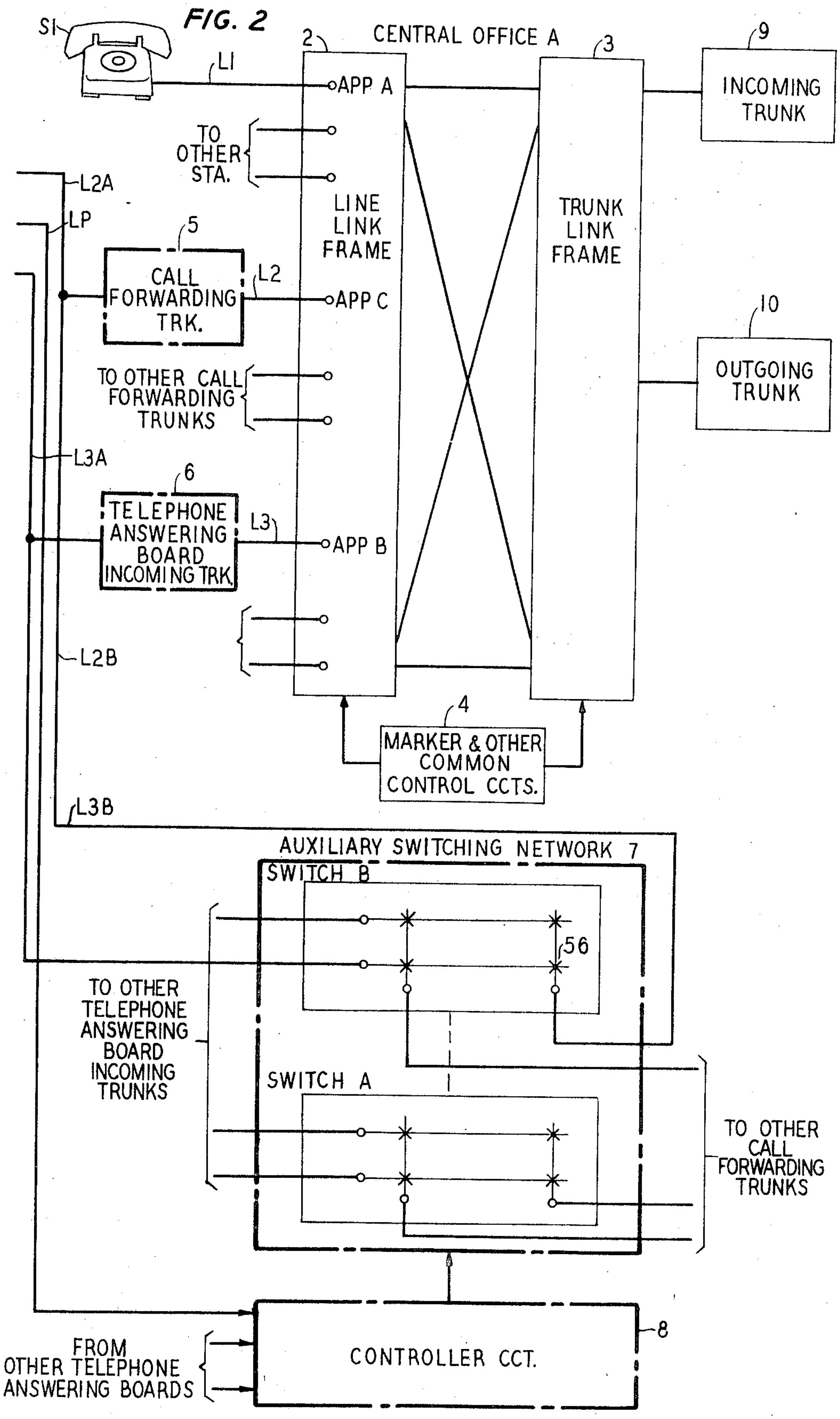

The interrelation and function of the equipment units of the exemplary embodiment will now be described with reference to FIGS. 1 and 2 wherein the interconnection of circuit blocks has been designated by means of arrows to show the direction of circuit action.

FIG. 1 shows a switchboard 11 which for purpose of the illustrative embodiment is intended to represent one such position arranged to provide telephone answering service. It is, of course, obvious that although only one position is shown, numerous positions may, in fact, be employed and multipled in the well-known prior art manner. In addition, although only one telephone answering service will be described with reference to central office A, it will be obvious that such description is equally applicable to telephone answering service switchboards at diverse locations (not shown) which are associated with central office A.

Switchboard 11 comprises cord circuits 12 and 13, each of which is associated with the switchboard appearance of call forwarding trunk 5 and telephone answering board incoming trunk 6, respectively. Each cord circuit contains the well-known "talk and dial" key (viz keys K1A and K2A respectively) which, when enabled, permit communication between the attendant and the calling or called station in addition to associating the operator position dialing equipment with a trunk so as to permit dialing of a called number. Each of the cord circuits also comprises a holding bridge (not shown) which is effective in the well-known manner to place a holding bridge across the conductors of the associated trunk loop during the period that the attendant is disassociated therefrom.

Each of the cord circuits also contains a plug-ended cord respectively designated C1A and C2A. The principal purpose of the cord, as is well known in the art, is to enable the attendant to communicate with the connected station upon insertion of the cord plug (such as C1A) into the appropriate jack (such as J2).

Telephone answering board incoming trunk 6 is shown as appearing on switchboard 11 via a jack designated J2 which provides the tip, ring and sleeve conductors of the communications path associated with the incoming trunk in the well-known manner. Lamp L2 at switchboard 11 is also shown associated with trunk 6 and is utilized to alert the attendant to the enabling of the trunk in response to an incoming call.

In similar fashion, call forwarding trunk 5 has associated therewith jack J1 and lamp L1 at switchboard 11. In addition, as noted earlier, telephone answering board incoming trunk 6 and call forwarding trunk 5 are independently connected to line appearances on line link frame 2 and to network appearances on auxiliary switching network 7.

It will be noted that although a manual-type switchboard has been selected for the illustrative embodiment to ensure clarity of presentation of the instant invention, in fact, numerous other types of attendant positions, including cordless key operated positions, may be employed.

We shall assume that an incoming call has been directed via incoming trunk 9 in central office A to station S1 which is provided with call answering service. We shall further assume that, in a manner well known in the art, the call is extended to telephone answering board incoming trunk 6 via its line appearance B on line link frame 2. Thus, upon the enabling of trunk 6, lamp L2 lights in the well-known manner at switchboard 11 so as to alert the attendant to the existence of the incoming call. The attendant thereupon inserts cord C2A into jack J2 in order to associate the switchboard position circuit (not shown) with the calling party. The attendant thereupon enables key K2A to the "talk and dial" position thereby completing a communications path in the well-known prior art manner between the attendant position circuit and the calling station via incoming trunk 6. We shall assume that the attendant concludes, after conversing with the calling party, that the nature of the call dictates its completion through to the subscriber having the benefit of the call answering service. We shall further assume that the attendant is aware of the called directory number at which the subscriber may be reached and determines that the appearance of call forwarding trunk 5 at jack J1 of switchboard 11 is available and thus may be utilized for this purpose.

The attendant thereupon releases the previously enabled "-talk and dial" key K2A and operates key K1A which is associated with jack J1. Cord C1A is then inserted into jack J1, thereby seizing call forwarding trunk 5. In response to the enabling of line appearance C of call forwarding trunk 6 on line link frame 2, marker circuit 4 functions in the well-known manner to complete a linkage path through the main switching network to the appearance of a register circuit (not shown) on trunk link frame 3. Upon receipt of dial tone from the register, the attendant dials the desired number.

The originating register (not shown) records the transmitted called directory number whereupon as well known in the prior art, marker and other common control circuits 4 establishes a linkage path from appearance C on line link frame 2 of call forwarding trunk 5 to trunk link frame 3 and to the called station (not shown) via outgoing trunk 10. We shall assume that the called station answers and that the attendant at position 11 indicates that a call initially directed to station S1 is now to be extended to the customer associated with station S1 at the newly called location.

It will be obvious at this point in the instant connection than an incoming call connection exists from the calling station (not shown) through incoming trunk 9, via the main switching network of central office A through trunk link frame 3 and line link frame 2, via appearance B and through telephone answering board incoming trunk 6 to attendant position 11. An outgoing connection also exists from telephone answering board 11 through call forwarding trunk 5 to the associated appearance C, and through the main switching network of central office A via a linkage path extending from line link frame 2 through trunk link frame 3, through outgoing trunk 10 to the called station (not shown).

The attendant now inserts the cord associated with dialing circuit 14 at position 11 into jack J3 at the switchboard thereby connecting dial 106 in dial circuit 14 via a metallic loop extending to controller circuit 8 in central office A.

It is of course obvious that numerous other dialing arrangements may be provided at switchboard 11; for example, the dial associated with the attendant's position circuit may be utilized in lieu of dial circuit 14.

The attendant is aware at this time of the respective identies of the particular telephone answering board incoming trunk and call forwarding trunk which are to be interconnected. Accordingly, the attendant now dials a three-digit code, the first digit of which identifies call forwarding trunk 5 and the latter two digits of which identify telephone answering board incoming trunk 6. As will be apparent from that which is contained hereinafter, this information is recorded in controller circuit 8 which thereupon enables a linkage path through auxiliary switching network 7 so as to interconnect call forwarding trunk 5 with telephone answering board incoming trunk 6. Accordingly, cross-point 56 is enabled at this time to interconnect the aforesaid circuits. Conversation may now ensue between the calling station and the called station via the earlier described linkage path extending through the main switching network now completed by virtue of its closure through auxiliary switching network 7. The attendant may now disconnect from the connection.

Lamps L1 and L2 remain in a lighted condition during the continuation of the above-described communication path. Upon abandonment of the connection by each of the parties thereto, the lamps associated with call forwarding trunk 5 and telephone answering board incoming trunk 6 will be extinguished thereby rendering the circuits available for subsequent use on other connections. It will thus be obvious in accordance with the foregoing that the final communications path of the call forwarded under control of the telephone answering switchboard, is extended via a linkage path through central office A which does not physically extend through the answering board switchboard position. It will also be obvious from the foregoing that controller circuit 8, auxiliary network 7, the other call forwarding circuits appearing on line link frame 2, and the other telephone answering board incoming trunks appearing on line link frame 2, may be respectively associated with other telephone answering boards at diverse physical locations from switchboard 11 and thus may cause the extension of calling connections in a manner identical to that hereinbefore described.

DETAILED DESCRIPTION

Figure 7:
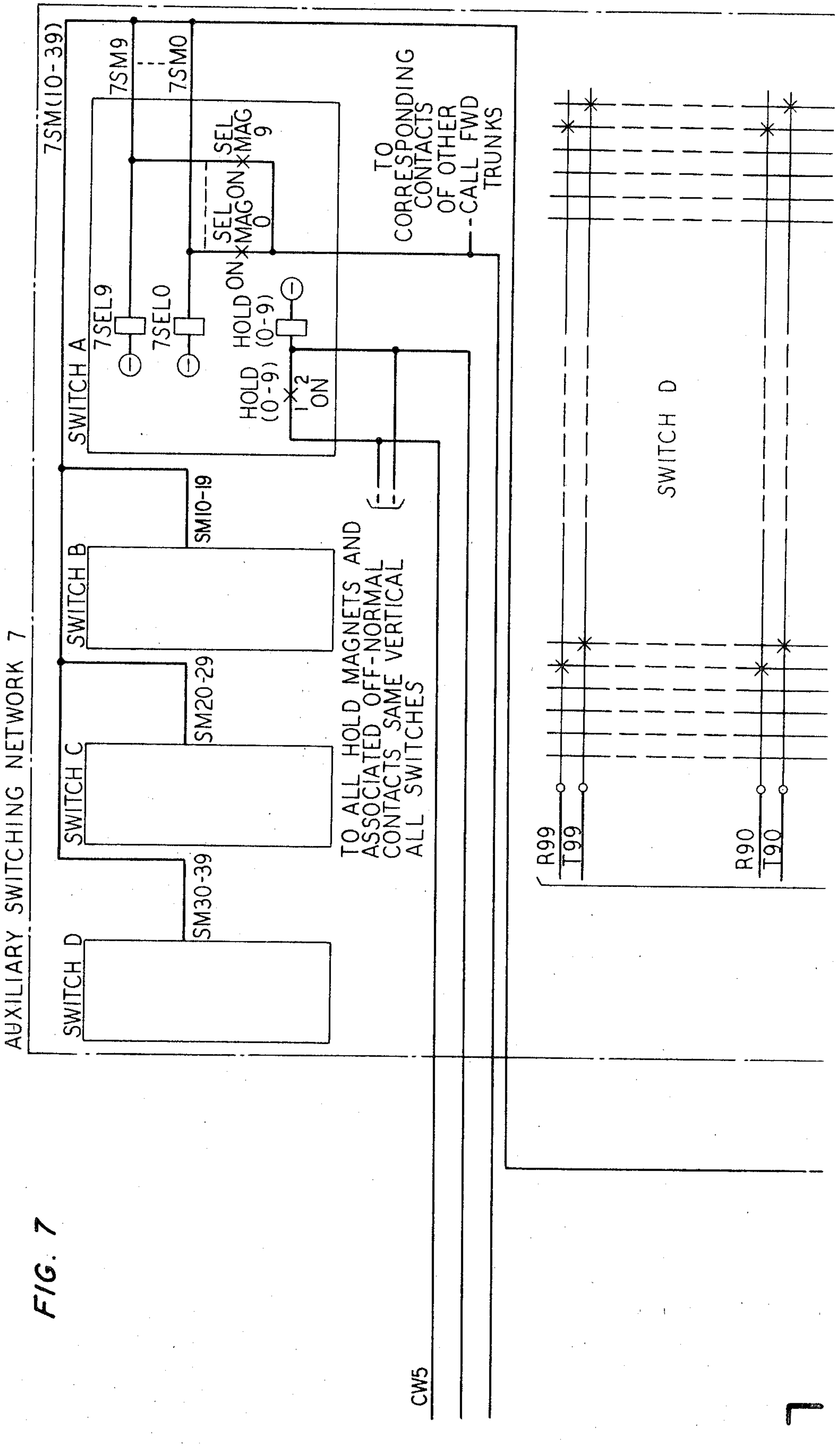
Figure 8:
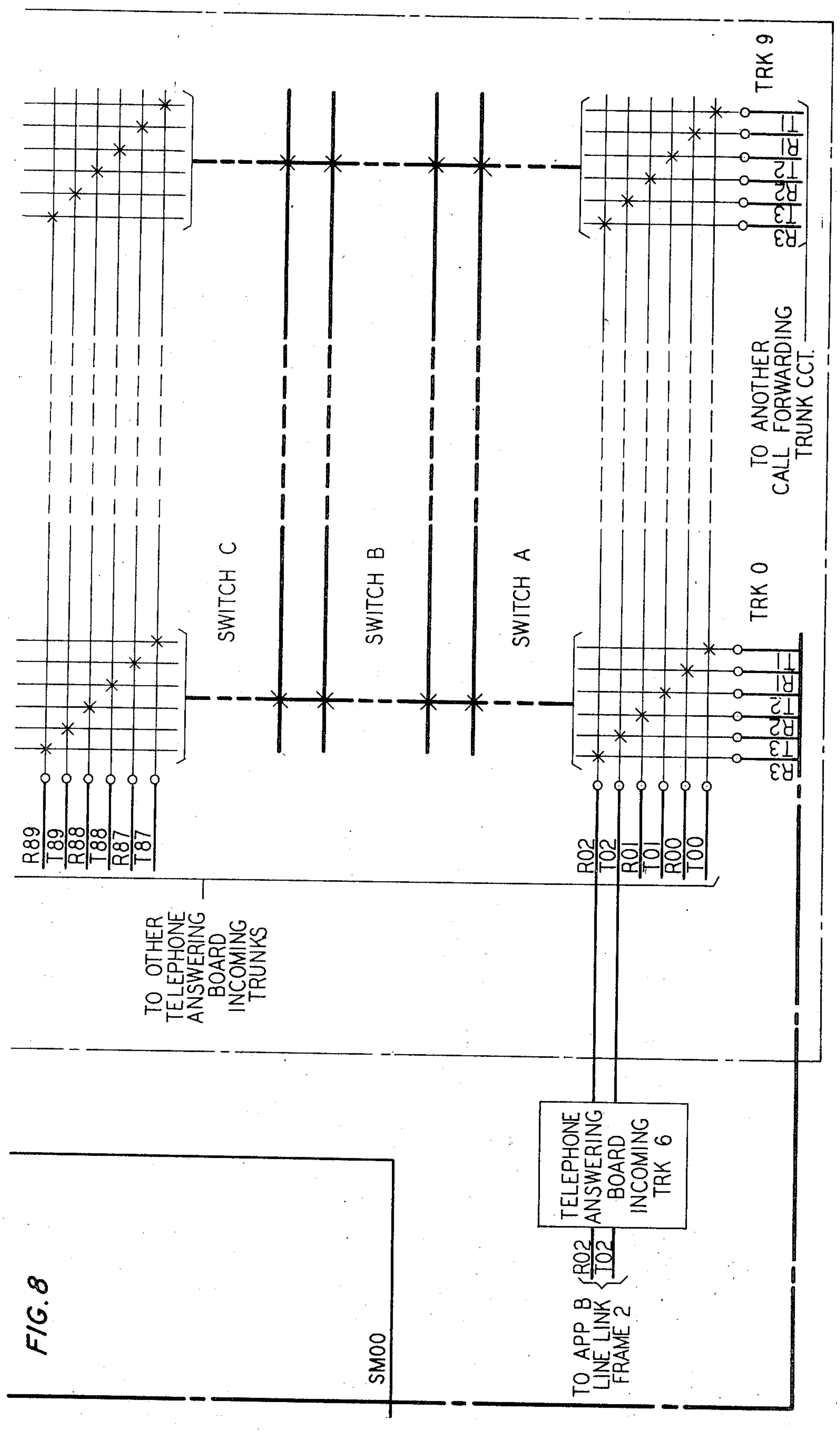

A clearer understanding of the detailed description of the illustrative embodiment will be facilitated by a prior discussion of certain of the components of the exemplary embodiment. Referring to FIGS. 7 and 8, auxiliary switching network 7 consists of four switching modules each comprising a 100-point six wire crossbar switch. Thus, switches A, B, C, and D each comprise 10 select magnets and 10 hold magnets to control the individual horizontal levels and vertical units respectively. Accordingly, an enabled cross-point at the intersection of any horizontal level and vertical unit completes a six-conductor path. There are three telephone answering board incoming trunks associated with each of the horizontal levels via their respectively designated T- and R- conductors.

Each vertical unit of switch A is multipled to the correspondingly designated vertical unit of the other switches in auxiliary switching network 7. Thus, each of the vertical units is associated with an individual call forwarding trunk, which total 10 in number. Accordingly, upon the enabling of a selected cross-point, three telephone answering board incoming trunks are extended through switching network 7 to a call forwarding trunk associated with the enabled vertical unit. As will be apparent from that which is contained hereinafter, upon being enabled each call forwarding trunk is operable to select one of the aforesaid three telephone answering board trunk pairs for extension through the call forwarding trunk circuit.

Telephone answering board incoming trunk 6, which is shown in block form on FIG. 8, is intended to represent any one of a number of configurations well known in the art operable to provide a communication path from a called station through to a remote point. Accordingly, to simplify the drawing, this circuit is not shown in detail.

Proceeding now with the description, we shall assume that a call has been directed to station S1 (FIG. 2) and that this call has been extended via telephone answering board incoming trunk 6 to attendant position 11, and further, that the attendant at switchboard 11 has recognized that the call should be further extended to a remote telephone station via central office A. The foregoing occurs in a manner hereinbefore described in the general description.

Figure 5:
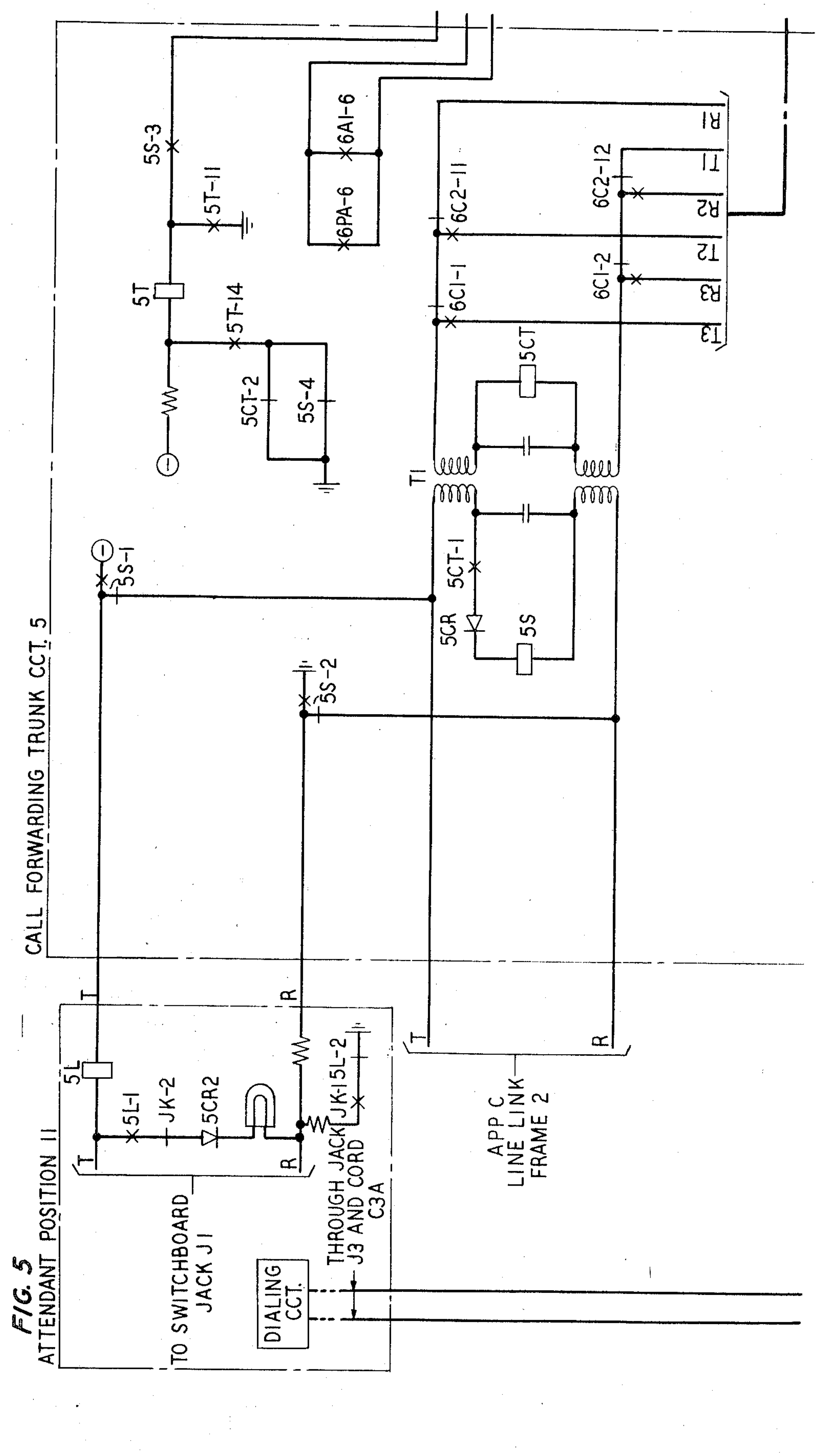
FIGS. 5 through 8 are schematic drawings showing in greater detail the interrelationship and functioning of the components of the exemplary embodiment.
Figure 6:
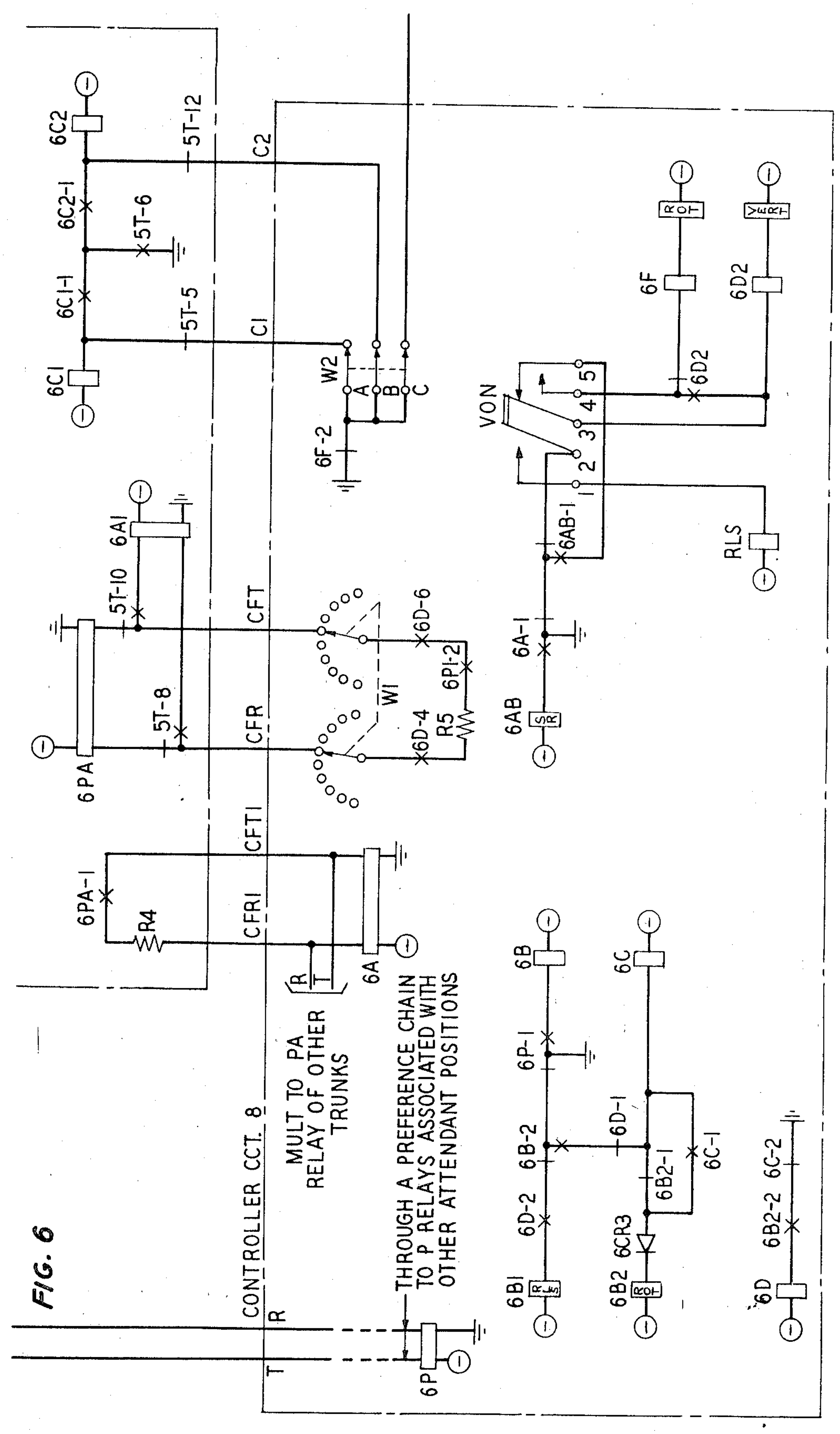

Referring now to FIG. 5, in order to select call forwarding trunk circuit 5, the attendant inserts a switchboard cord into jack J1 as earlier described. The enabling of jack J1 operates the associated make contact JK–1 thereby extending ground through released break contact 5L–2 to the R-conductor from attendant position 11 to call forwarding trunk 5, through released break contact 5S–2 and via appearance C of line link frame 2 to signal the central office at this time. In a manner well known in the art, an originating register is thereupon connected through to appearance C on line link frame 2, and ground is applied to the T-conductor of call forwarding trunk circuit 5 at its appearance C on line link frame 2. This ground is extended through released transfer contact 5S–1, via the T-conductor of call forwarding trunk circuit 5 to attendant position 11, through the winding of the 5L relay, through the attendant position bridge circuit (not shown) back via the R-conductor from attendant position 11 through call forwarding trunk circuit 5 to battery present at the central office in the well-known manner. Relay 5L accordingly operates at this time thereby enabling break contact 5L–2 and thus removing the ground previously extended on the R lead.

In response to dial tone, the attendant dials the directory number of the station to which the call is to be extended. In response to registration of the called directory number, the equipment of central office A responds, in a manner well known in the art and as fully set forth in the cited Busch patent, to cause completion of the connection to the called station. When the called party has answered, the attendant advises the party that a waiting connection is to be extended to that station.

Dialing circuit 14 an attendant position 11 is thereupon associated with controller circuit 8 via cord C3A and jack J3, as earlier set forth. As also earlier described, a connection between call forwarding trunk circuit 5 and telephone answering board incoming trunk 6 is affected through auxiliary switching network 7 in response to the transmission of a three-digit code; the first digit of which identifies the call forwarding trunk circuit and the latter two digits of which identify the particular telephone answering board incoming trunk. Upon the association of dialing circuit 14 at attendant position 11 with controller circuit 8, relay 6P operates via an obvious circuit completed by the T- and R-conductors extending therebetween. Relay 6B thereupon operates through enabled make contact 6P–1 to ground. Relay 6B will hold operated over the ensuing dial pulses since it is a slow operate relay.

The attendant now dials the identifying digit for call forwarding trunk circuit 5. During dial pulsing, the first release of relay 6P completes the operate path of relay 6C which extends through released break contact 6D–1, operated transfer contact 6B–2, and released transfer contact 6P–1 to ground. Enabled make contact 6C–1 thereupon completes the enabling path of the 6B2 rotary magnet which steps wiper W1 to the desired terminals, namely the CFR and CFT conductors associated with call forwarding trunk circuit 5.

The enabling of break contact 6C–2 opens the obvious operate path of relay 6D preventing its operation during the transmission of the pulses associated with the first digit. At the end of the first digit, the aforedescribed operate path of relay 6C is opened upon the release of relay 6B thereby also opening the aforedescribed enabling path of the 6B2 rotary magnet. The release of break contact 6C–2 at this time completes the obvious operate path of relay 6D. Enabled make contacts 6D–4 and 6D–6 extend a pulsing path through wipers W1, via the CFR and CFT leads to call forwarding trunk circuit 5. The CFR and CFT leads are extended within call forwarding trunk circuit 5 through released break contacts on the 5T relay to the windings of relay 6PA. The enabled state of make contact 6P–1 completes the operate path of relay 6PA which extends via the aforedescribed path to operating potential present on the left and right windings of that relay in call forwarding trunk circuit 5.

The enabling of make contact 6PA–1 completes the obvious operate path of relay 6A in controller circuit 8. Relay 6AB operates at this time through enabled transfer contact 6A–1 to ground. The operation of relay 6AB prepares a path for operating the vertical magnet in series with relay 6D2. Upon the transmission of the second digit from attendant position 11, relay 6P follows dial pulses as earlier described. These dial pulses are repeated via make contact 6PA–1 from call forwarding trunk circuit 5 to relay 6A in controller circuit 8. At each interruption of the dial, relay 6A operates and releases the vertical magnet in series with relay 6D. Relays 6AB and 6D2 remain operated during this series of pulses since they are slow release relays. As soon as the shaft moves one vertical step, the original circuit through the VON contact springs for operating the vertical magnet is transferred from spring 3 to spring 4. At the end of the first digit, relay 6D2 releases, thereby preparing an obvious path for operating relay 6F and the associated rotary magnet.

When the second digit is received, the rotary magnet operates in series with the 6F relay and steps the bank wipers W2 to the desired terminal. The operated state of relay 6F maintains break contact 6F–2 in an open state thus isolating wiper W2 from ground potential until the end of the rotary stepping.

At the end of rotary stepping, relay 6F releases thereby restoring break contact 6F–2 to normal and thus extending ground via wiper W2 to the C1, C2 and SMOO conductors which extend from controller circuit 8. Thus ground is extended on the SMOO lead to auxiliary switching network 7 completing the obvious operate path of select magnet 7SELO in switch A. The operation of select magnet 7SELO extends ground through its off-normal contacts, through enabled make contact 6PA–6 in call forwarding trunk 5, to operate hold magnet 0 on each of switches A, B, C, and D in auxiliary switching network 7. The enabled state of the aforesaid hold magnet extends ground from the windings of the hold magnet to the CW5 lead to call forwarding trunk circuit 5 from which point it is extended through enabled make contact 5S–3 to operate relay 5T at this time.

The earlier described ground circuit extended from controller circuit 8 via the C1 and C2 leads causes the immediate operation of the correspondingly designated relays 6C1 and 6C2 in call forwarding trunk circuit 5. Upon the operation of make contact 5T–6, an obvious locking path is completed in call forwarding trunk circuit 5 for these relays. Concurrently therewith, the enabled state of make contact 5T–11 extends a locking ground for the earlier operated hold magnets via lead CW5 which extends to auxiliary switching network 7. Upon the removal of cord C3A from jack J3 at attendant position 11, relay 6P releases thereby restoring controller circuit 8 to normal. Accordingly, relay 6PA releases at this time. The subsequent release of make contact 6PA–6 opens the locking path previously provided for select magnet 7SELO.

As earlier noted, telephone answering board incoming trunk 6 appears on horizontal 0 of switch A and more specifically is connected via its T- and R- conductors to the T02 and R02 leads which, by virtue of the aforedescribed operation of select magnet 0 and hold magnet 0, are extended through the associated cross-point to conductors T3 and R3. These conductors extend to call forwarding trunk 5 and are further extended within call forwarding trunk 5 via enabled transfer contacts on the 6C1 relay to the primary of transformer T1.

Deviating momentarily, it will be noted that the particular set of T- and R-conductors (namely T1, R1; T2, R2; or T3, R3) which are extended into call forwarding trunk 5 is dependent upon the operated or released state of the 6C1 and 6C2 relays. As earlier described, the ground extended via the C1 and C2 leads from controller circuit 8 is dependent upon their respective continuity (or lack of continuity) to the A and B terminals of wiper W2. Accordingly, when the second two digits of the control code identifies a different telephone answering board incoming trunk, the A and B terminals of wiper W2 will extend ground via the C1 and C2 leads in a manner arranged to result in a different combination of the state of the 6C1 and 6C2 relays.

In view of the earlier described extension of call forwarding trunk circuit 5 from its appearance C on line link frame 2 to the remote station, it will be obvious that the calling party is now in telephonic communication with that station via the aforedescribed cross-point closure in auxiliary switching network 7 in central office A independently of any connection extending through attendant position 11.

The continuous metallic loop which extends from call forwarding trunk circuit 5 via the earlier described circuit path extending through auxiliary network 7 via the R3 and T3 conductors completes the obvious operate path of relay 5CT which remains operated until such time as the calling station abandons the connection. In similar fashion, the continuous metallic loop extending from call forwarding trunk circuit 5 via appearance C on line link frame 2 to the remote station, also operates relay 5S, which remains operated during the continuation of that circuit until such time as the called station abandons the connection. Upon abandonment of the connection by either of the aforesaid stations, the operate path of the respective aforesaid relay is opened thereby causing its release. As a result, break contact 5CT–2 or 5S–4 (or both) are released, thereby extending ground through the previously enabled make contact 5T–14 to cause the shunt release of relay 5T in call forwarding trunk circuit 5. Upon the release of make contact 5S–3 ground is removed from the CW5 lead thereby removing the holding ground for the hold magnets previously operated in switching network 7 thus restoring the associated linkage connection to normal. The call forwarding trunk circuit 5 and telephone answering board incoming trunk 6 are thereupon available to service other connections in a similar manner.

While my invention has been disclosed in an embodiment wherein a plurality of telephone answering switchboards are operable to extend telephone answering board incoming connections via an auxiliary switching network associated with the main switching network at a remote central office independently of any connection extending through the telephone answering switchboard, it is to be recognized that numerous other arrangements may be devised by those skilled in the art without departing from the spirit and scope of my invention.

For example, my invention may be employed to permit one or more attendant positions common to one or more central offices to selectively extend connections between circuits of different types without requiring that such connection physically extend through the remote location of the attendant position. By way of more specific example, such circuits may comprise equipment which is employed for the transmission of data as opposed to being predominantly for voice communication.

What is claimed is:

1. In a switching system, a main switching network comprising a plurality of line appearances and means for completing connections to and from said line appearances, an attendant position, means for establishing a first connection between said attendant position and a first of said line appearances, means controlled by said attendant position for establishing a second connection through said main switching network via another of said line appearances, an auxiliary network, and control means controlled by said attendant position for controlling said auxiliary network to interconnect said first connection and said second connection.

2. In a switching system, the combination set forth in claim 1 wherein said auxiliary network comprises a plurality of crossbar switches arranged in a crossbar grid network having input terminals and output terminals, means connecting certain of said line appearances including said first line appearance to said input terminals, and means connecting other of said line appearances including said another line appearance to said output terminals.

3. In a switching system, the combination set forth in claim 2 wherein said attendant position comprises signaling means, and wherein said control means is responsive to a control code generated by said signaling means identifying a particular input terminal and a particular output terminal for enabling said grid network to interconnect said particular input terminal and said particular output terminal.

4. In a switching system, the combination set forth in claim 2 wherein said grid network comprises means operable to interconnect any said input terminal with any said output terminal.

5. In a telephone system, a main switching network comprising a plurality of line appearance, a plurality of trunk appearances, and means for completing connections between said trunk appearances and said line appearances, an auxiliary switching network for interconnecting certain said line appearances, and a plurality of attendant positions each comprising means connected to a first line appearance for answering a call incoming to an attendant position, means connected to a second line appearance for selecting one of said trunk appearances through said main switching network, and signalling means for enabling said auxiliary network to interconnect said first line appearance and said second line appearance.

6. In a switching system, a main switching network comprising a plurality of line appearances and means for completing connections to and from said line appearances, an auxiliary switching network for interconnecting certain said line appearances, a plurality of attendant positions, means for establishing a first connection between a first of said line appearances and each of said positions, means controlled by each said position for enabling said main switching network to establish a second connection via a second of said line appearances, and means controlled by each said position for enabling said auxiliary network to interconnect said first line appearance and said second line appearance.

7. In a telephone switching system, a switchboard, a plurality of calling line circuits connected to said switchboard, and a central office comprising a plurality of call forwarding trunk circuits, a main switching network upon which are terminated said calling line circuits and said call forwarding trunk circuits, an auxiliary switching network for interconnecting said line circuits and said call forwarding trunk circuits, means controllable from said switchboard for selecting a called line through said main switching network via one of said call forwarding trunk circuits, and control means responsive to signals from said switchboard for enabling said auxiliary network to interconnect any of calling line circuits with said one call forwarding trunk circuit independently of any connection through said switchboard.

8. A telephone switching system for the remote extension of calls to a telephone answering position through the switching network of a telephone central office comprising a plurality of telephone answering incoming trunks each connected to a line appearance on the switching network and extending to the answering position, a plurality of call forwarding trunks each connected to a line appearance on the switching network and extending to the answering position, an auxiliary switching network for interconnecting directly a selected one of said telephone answering incoming trunks with a selected one of said call forwarding trunks, and control means responsive to signals from the answering position for controlling said auxiliary switching network.

9. A telephone switching system in accordance with claim 8 wherein said control means includes means responsive to signals from the telephone answering position for determining the one of said telephone answering incoming trunks and the one of said call forwarding trunks to be interconnected.

10. A telephone switching system in accordance with claim 9 wherein said auxiliary switching network includes input and output sets of terminals, said telephone answering incoming trunks being connected to one set of said terminals and said call forwarding trunks to the other set of said terminals.

11. A telephone switching system in accordance with claim 10 wherein said call forwarding trunks and said telephone answering incoming trunks are each connected to the answering position by a separate line and wherein said control means is connected to the answering position by a line distinct from said telephone answering incoming trunks and said call forwarding trunks.

* * * * *